July 29, 1941.   C. M. WEBER   2,250,938
OSCILLATING MIRROR MECHANISM FOR MOTION PICTURE MACHINES
Filed Feb. 19, 1940
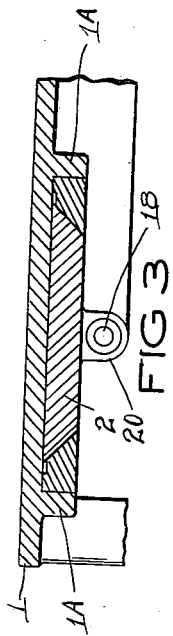
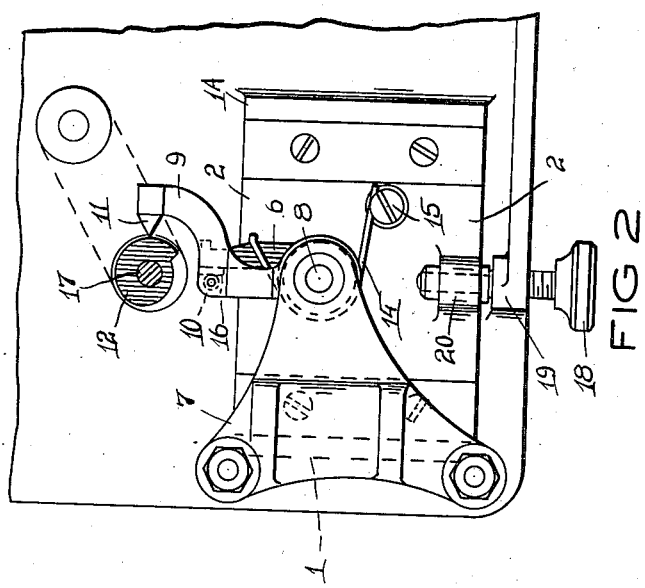
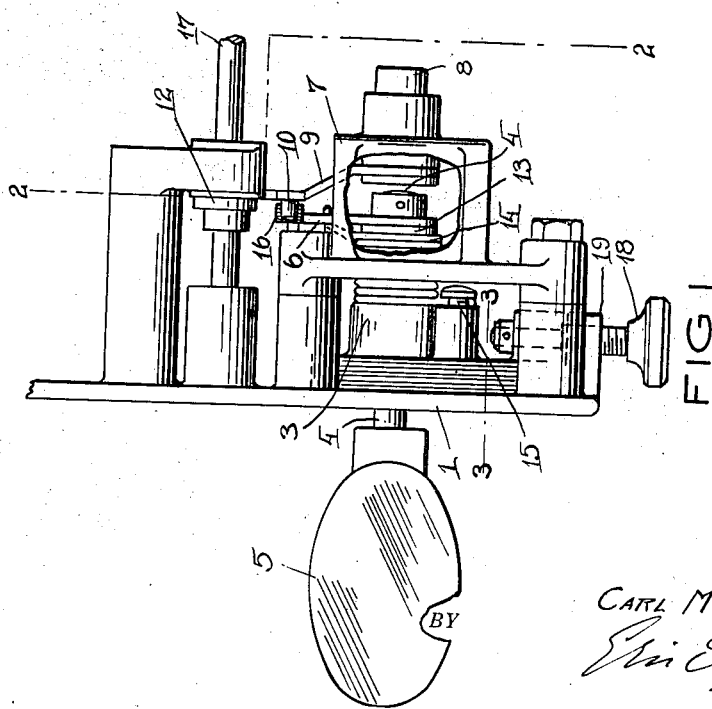
INVENTOR
CARL M. WEBER
ATTORNEY Patented July 29, 1941

2,250,938

UNITED STATES PATENT OFFICE 2,250,938

OSCILLATING MIRROR MECHANISM FOR MOTION PICTURE MACHINES

Carl M. Weber, Rochester, N. Y.

Application February 19, 1940, Serial No. 319,668

6 Claims. (Cl. 74—96)

This invention relates to motion picture projecting machines of the type in which the film is continuously and uniformly driven and an oscillating mirror is utilized to movably reflect the individual exposures on the film in order to optically produce an intermittent projection that will provide on the screen a clear and sharp picture from the consecutive frames of the film, and the principal object of the invention is to provide a novel mechanism for the adjustment of the angular movement of the reflecting mirror in order to compensate for changes in the film which may be due to weather conditions or are caused by the age or the use thereof and also to make the reflecting mechanism adapted for use with projection lenses which slightly vary in their focal length.

This and other objects and attendant advantages of the invention will become more readily apparent from the detailed description of one embodiment thereof, reference being had to the accompanying drawing in which Figure 1 is a top plan view partly broken away of my novel oscillating mirror mechanism.

Figure 2 is a rear elevation thereof.

Figure 3 is a detail sectional view taken on the line 3—3 of Figure 1.

In a motion picture projection machine which is adapted to protect a clear and sharp picture by means of a continuously moving motion picture film, the reflecting mirror which makes this possible must have an angle of oscillation relative to the movement of the individual "frames" of the film and the focal length of the projection lens. Because of the fact that in production it is not practical to produce projection lenses of accurately uniform focal length it is therefore necessary to provide a method for adjusting the angle of oscillation for proper reflection by each lens used. Furthermore the dimensions of the "frames" in motion picture films vary with atmospheric conditions and with the age of the film so that in order to compensate for such variations a quick and easy adjustment of the angle of oscillation of the reflecting mirror is also absolutely essential for proper projection of the film.

The apparatus forming the subject matter of my invention which accomplishes such quick, easy and accurate adjustment of the angle of oscillation, as illustrated in the figures of the drawing, comprises a suitable frame 1 which is provided with the gibs 1A, 1A to guide a slide 2 between them. On the slide is provided the bearing 3 in which is journaled the oscillating shaft 4. This shaft carries on the outside of the frame the reflecting mirror 5 and on the inside the lever arm 6.

To one side and overhanging the slide 2 is the bracket 7 in which is journaled the rocking shaft 8. The bracket spacedly supports the rocking shaft from the oscillating shaft 4 to permit the oscillating shaft to be moved into and out of axial alignment therewith. The rocking shaft has keyed or otherwise fastened thereto the lever arm 9 which carries the connecting pin 10 and is provided with a pointed end 11 with which it is adapted to contact the cam 12.

Coiled around the outside of the boss 13 which surrounds the bearing 3 is the spring 14 which has one end anchored to the stud 15 while the free end engages the lever arm 6 so as to force the connecting surface 16 thereof against the connecting pin 10 of the lever arm 9. This in turn yieldingly holds the pointed end 11 of the lever arm against the cam surface of the cam so that the rotation of the cam by means of the shaft 17 causes the lever arm to rock and transmit its rocking motion to the lever arm 6 for the oscillation of the reflecting mirror 5.

The slide 2 is moved between the gibs 1 by means of the adjusting screw 18 which is threaded in the lug 19 at the bottom of the frame 1 and journaled in the lug 20 at the bottom of the slide 2 so that by rotating the adjusting screw the slide is moved up or down to bring the oscillating shaft into or out of alignment with the rocking shaft 8.

The adjustment of the slide causes the connecting pin 10 to move on the connection surface 16 of the lever arm 6. In this way the connection between the two lever arms 6 and 9 may be varied to cause the lever arm 6 to oscillate in the same angular movement of the lever arm 9 by bringing the two shafts 4 and 8 in axial alignment with each other, or cause an increased or decreased angular movement of the lever arm 6 over the lever arm 9 by increasing or decreasing the distance between the center of rotation of the lever arm 6 and its point of contact with the pin 10 on its connecting surface 16 by the movement of the center of rotation of the oscillating shaft 4, to a point below or above the center of rotation of the rocking shaft 8.

I claim:

1. In a mirror oscillating mechanism for motion picture projectors the combination of an oscillating shaft, a mirror adapted to be oscillated by said oscillating shaft, a rocking shaft arranged axially parallel and spaced endwise to said oscillating shaft, an arm carried by each of said shafts, a sliding connection between said arms to provide endwise movement of one arm relative to the other arm, and means for shifting the center of rotation of one of said shafts relative to the center of rotation of the other of said shafts to vary the sliding connection between said arms and change the angular movement of said oscillating shaft relative to that of said rocking shaft thru the connection between said arms.

2. In a mirror oscillating mechanism for motion picture projectors the combination of an oscillating shaft having a movable center of rotation, a mirror adapted to be oscillated by said oscillating shaft, an arm carried by said oscillating shaft, a lever arm having a fixed center of rotation for operation of said oscillating shaft, means providing a predetermined angular swinging movement for said lever arm, a sliding connection between said arm and said lever arm intermediate the ends of said lever arm, and means for shifting the center of rotation of said oscillating shaft relative to the fixed center of rotation of said lever arm to vary the sliding connection between said arms and change the angular oscillating movement of said oscillating shaft relative to the angular swinging movement of said lever arm.

3. In an adjustable mirror oscillating mechanism for motion picture projectors, the combination of a frame, a slide movable on said frame, a rocking shaft journaled in said frame, an oscillating shaft journalled on said slide and movable by said slide axially parallel to said rocking shaft, an arm carried by said oscillating shaft, a lever arm carried by said rocking shaft, and a sliding connection between said arm and said lever arm for adjustment by the movement of said oscillating shaft by said slide.

4. In an adjustable mirror oscillating mechanism for motion picture projectors, the combination of a frame, a slide movable on said frame, a lever arm journaled on said frame, an oscillating shaft movable by said slide axially parallel to the axis of said lever arm, rotary cam means having a fixed center of rotation and providing a predetermined angular movement for said lever arm, an arm carried by said oscillating shaft, and a variable sliding connection between said arm intermediate the centers of rotation of said lever arm and rotary cam means and said lever arm to provide an increased or decreased angular movement of said oscillating shaft relative to the predetermined angular movement of said lever arm by a movement of said oscillating shaft transversely of its axis.

5. In an adjustable mirror oscillating mechanism for motion picture projectors, the combination of a frame, a slide movable on said frame, a rocking shaft journaled on said frame, an oscillating shaft movable by said slide, axially parallel to said rocking shaft, an arm carried by said oscillating shaft, a lever arm carried by said rocking shaft, rotary cam means having a fixed center of rotation for operating said lever arm, a connecting member carried by said lever arm for variable sliding contact with said arm intermediate the centers of rotation of said rotary cam and said oscillating shaft, yielding means for holding said arm against said connecting member and said lever arm against said cam means.

6. In a mirror oscillating mechanism for motion picture projectors, the combination of a rocking shaft having a fixed center of rotation and an axially parallel oscillating shaft spaced endwise therefrom for movement transversely thereto, rotary cam means having a fixed center of rotation, a lever arm carried by said rocking shaft for engagement and predetermined angular movement by said rotary cam means, an arm carried by said oscillating shaft for sliding engagement with said lever arm between the fixed centers of rotation of said rotary cam means and said rocking shaft, means for transversely moving said oscillating shaft axially parallel to said rocking shaft for varying the angular movement of said arm and oscillating shaft by said lever arm, and a mirror carried and oscillated by said oscillating shaft.

CARL M. WEBER.